No. 774,808. PATENTED NOV. 15, 1904.
C. S. WHEELWRIGHT.
APPARATUS FOR REMOVING OIL OR GREASE FROM GARBAGE OR OFFAL.
APPLICATION FILED AUG. 13, 1904.
NO MODEL. 2 SHEETS—SHEET 1.

No. 774,808. PATENTED NOV. 15, 1904.
C. S. WHEELWRIGHT.
APPARATUS FOR REMOVING OIL OR GREASE FROM GARBAGE OR OFFAL.
APPLICATION FILED AUG. 13, 1904.
NO MODEL. 2 SHEETS—SHEET 2.

Witnesses
Inventor
Charles S. Wheelwright,
by Foster, Freeman & Watson,
Attorneys No. 774,808.

Patented November 15, 1904.

UNITED STATES PATENT OFFICE.

CHARLES S. WHEELWRIGHT, OF BRISTOL, RHODE ISLAND.

APPARATUS FOR REMOVING OIL OR GREASE FROM GARBAGE OR OFFAL.

SPECIFICATION forming part of Letters Patent No. 774,808, dated November 15, 1904.

Original application filed June 8, 1904, Serial No. 211,713. Divided and this application filed August 13, 1904. Serial No. 220,641.

(No model.)

*To all whom it may concern:*

Be it known that I, CHARLES S. WHEELWRIGHT, of Bristol, in the State of Rhode Island, have invented a new and useful Apparatus for Removing Oil or Grease from Garbage or Offal, of which the following is a specification.

The process carried on by the said invention involves a hot-water process similar to that carried on by the apparatus described in my Patent No. 709,836, dated September 23, 1902; and it consists in cooking the garbage or offal in a steam-tight vessel or digester by the introduction of water and fresh steam into the mass of said garbage or offal near the bottom thereof, increasing the volume of water by the addition of water from an independent source, floating up into a separating-chamber by said increased volume of water the melted grease separated from said garbage or offal, at the same time holding back the solid parts of the said garbage or offal, from time to time blowing off water from the top of the steam-tight vessel or digester below the melted grease, shutting off melted grease and water in said separating-chamber from said steam-tight vessel or digester and allowing the same to separate by gravity the water from the grease, drawing off the water from below said melted grease, and finally drawing off the melted grease.

The apparatus which is the subject of the present invention consists in the combination, with a digester or steam-tight vessel adapted to melt and float the grease from the garbage or offal provided with a blow-off pipe near its top, of a water and grease receiver above said digester and separated therefrom by a throat or passage-way containing a valve and a draw-off pipe for water or melted grease, the said throat and the said receiver being provided with water-glasses by which the condition of the water and grease at any time within the throat and the receiver may be readily determined.

This apparatus is of simple construction, but requires close attention on the part of the operator.

Figure 1:
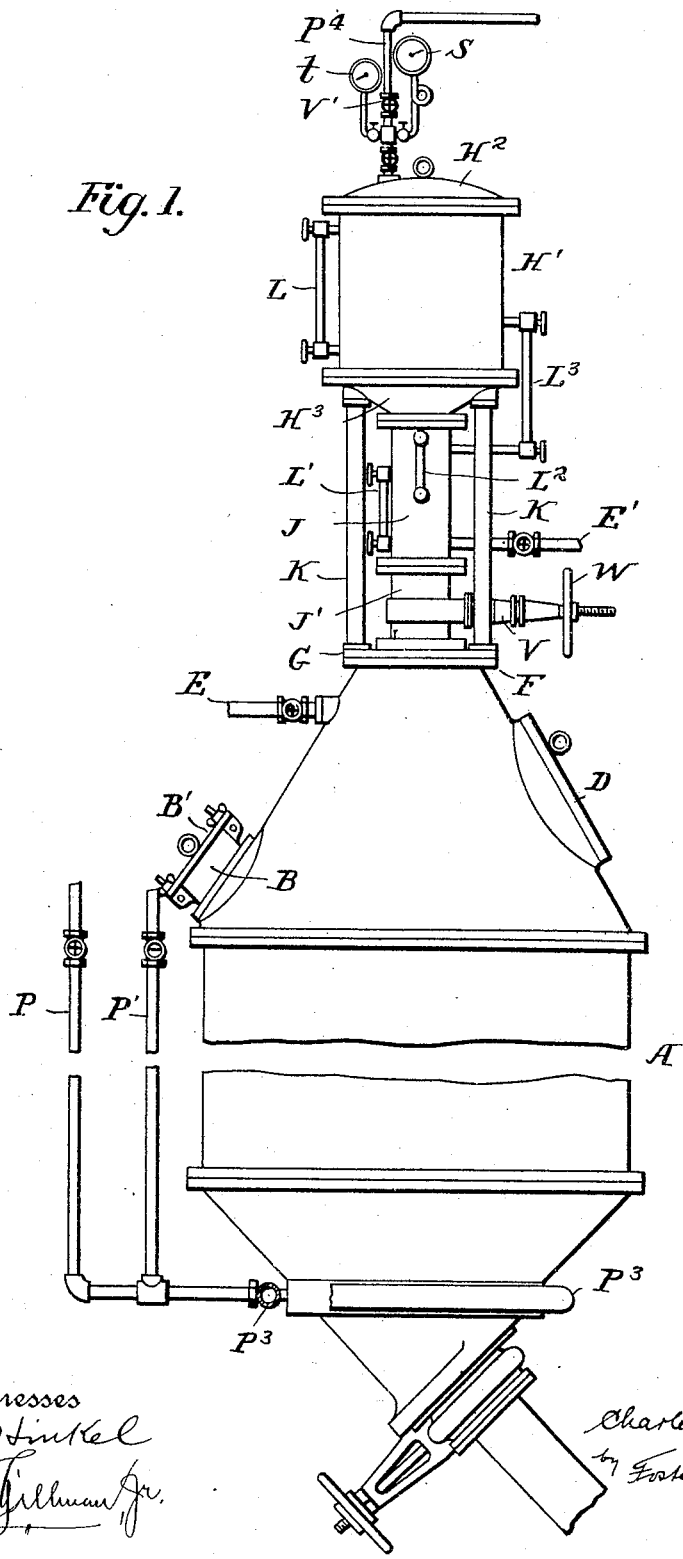
Figure 2:
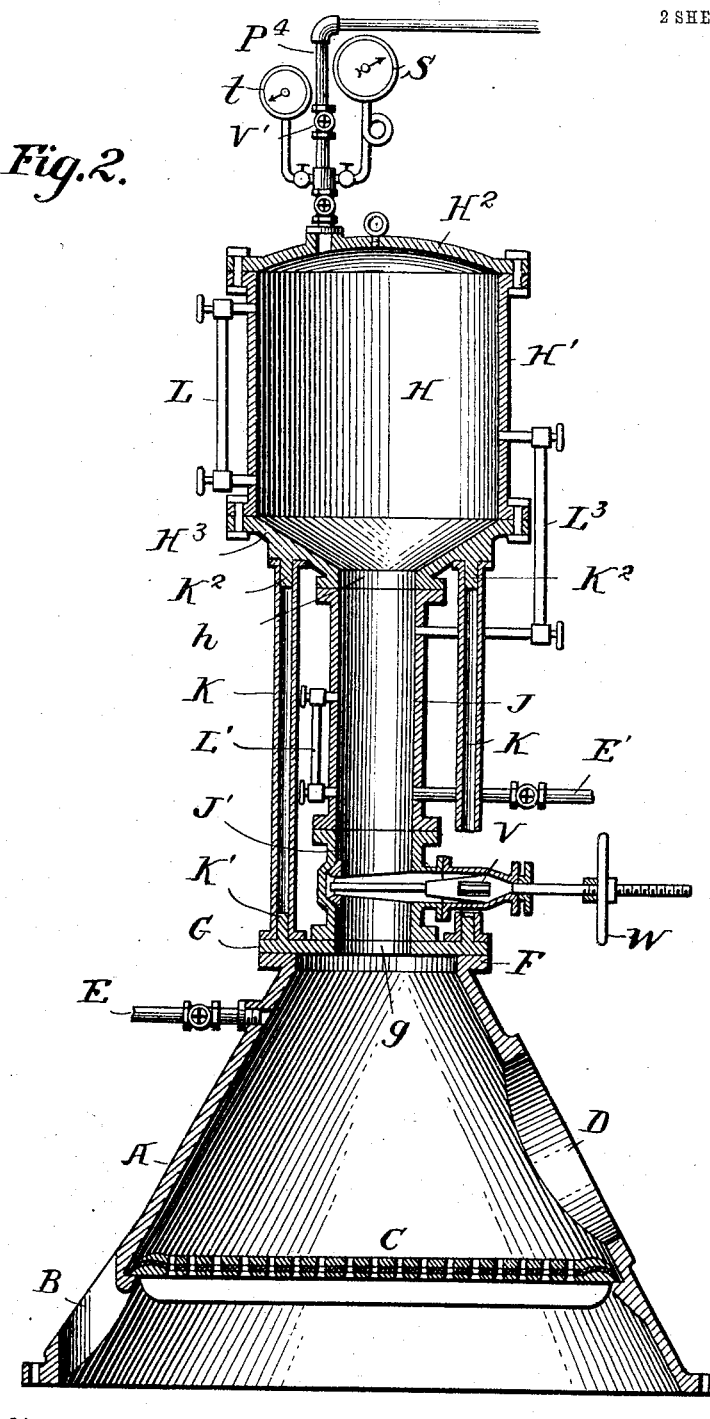

Figure 1 is a front view of the digester and feed-pipes for steam and water, broken at the middle as shown, together with the grease-receiver and the throat connecting the digester with said receiver. Fig. 2 is a sectional view of the upper part of the same.

A is a steam-tight vessel formed in sections, as shown, herein termed the "digester."

B is a hole or entrance through which the garbage or offal is inserted in said digester. B' is a cover for the same. C is a filter provided with long hanging blades or teats placed immediately above said entrance for said garbage or offal, the office of which is to hold back the solid parts of the garbage or offal while the water and melted grease are floated upward through said filter. The blades or teats hold back the solid parts of the garbage or offal from the holes in said filter through which the melted grease freely passes and prevent the clogging of said holes. D is a manhole through which said filter is placed in position or through which it may be removed to be cleaned.

E is a valved blow-off pipe for blowing off water from time to time.

P is a pipe leading from the boiler, (not shown,) and P' is a pipe leading from a hot-water tank, (not shown,) both connecting with a circular pipe $P^3$ for supplying, respectively, steam and fresh water to the digester, as shown, for cooking the garbage or offal and floating the melted grease upward.

The upper part of the digester is a hollow truncated cone, as shown, with a flat rim at the top F, upon which is bolted the head G of the said digester, in which is a large hole $g$ for the passage of melted grease and water into the receiver H. The receiver H is made up of a large casting H', large enough to hold the average amount of grease of a full charge of garbage or offal in the digester, a top $H^2$, and a bottom $H^3$. The bottom is flanged, as shown, and has in it a circular hole $h$ of a diameter the same as the inner diameter of a flanged circular casting J, the flange of the bottom $H^3$ resting upon the upper flange of a similar casting J', whose lower flange rests upon head G of the digester, the holes $h$ and $j$ and the interiors of the casting J and J' being all of uniform diameter and forming a throat through which water and melted grease pass from the digester A to the receiver H.

The receiver H finds further support upon the digester by means of hollow posts K K, &c., which fit upon projections K' K' from the said head G of the digester and into which fit similar projections $K^2$ $K^2$ from said bottom $H^3$ of the receiver. A large valve in casting J, operated by a hand-wheel W, is used to open or close communication between the digester and the receiver.

The receiver H is provided with a glass L, herein called a "water-glass," to indicate the height to which grease and water may at any time have risen in the receiver, and care must be taken to blow off water or water and steam by the blow-off pipe E in the receiver from time to time, so that an air-space shall be seen in said glass L above any grease or water therein.

Near the bottom of the casting J or anywhere in the throat above the valve V is a pipe E', by which water and melted grease may be finally drawn from the apparatus after the cooking is complete, as hereinafter directed. The said throat or the casting J is also provided with water-glasses L' $L^2$ $L^3$, &c., at different heights in said throat, the last-named, $L^3$, connecting said throat with the receiver, as shown, by observing which the condition of affairs in the throat and the receiver may be pretty exactly determined, as follows: As the melted grease is floated up upon the water, continually increasing in volume by additional water admitted from pipes P and P', a slight film of the grease enters the lower entrance to the lowest water-glass L', followed by the water. This film, more or less increased, it may be, by additional melted grease rising in the water, is carried upward by the water in the said water-glass to the top of the said water-glass L', from which it joins the melted grease in the throat which has been carried upward by the water in the throat. In the meantime a larger quantity of the grease enters the bottom of the second water-glass $L^2$ and is carried up to the top of the second glass, where it joins the melted grease that has risen to the same height in the throat, this melted grease already entering the third water-glass $L^3$, &c. The water-glass L, attached to the receiver, will in like manner begin to fill mostly with melted grease, and when any considerable quantity of water follows up the grease in this glass water should be blown off from the digester through the blow-off pipe E until the water disappears from the glass L. This action is repeated from time to time until the entire water-glass L below the above-mentioned air-space is filled with grease, which as the cooking draws to a close will or may after a blowing off show itself in the top of the water-glass $L^3$ and even in the top of glass $L^2$ in throat. When this happens, the water-glass L being substantially full of grease, the cooking will be complete, the valve V will be closed, water will be drawn off through pipe E', and then melted grease through the same pipe. It may be that when the cooking is completed and no more grease can be floated from the garbage in the digester water will show at the bottom of the glass L in the receiver, and it may be that the grease will fill all the glasses in the throat before the cooking is completed, owing to the different conditions of the charge of garbage at the beginning of the operation; but by attention the operator can easily determine the condition of the cooking and regulate the blowing off of water and the final drawing off of water and melted grease.

$P^4$ is a pipe with a steam-pressure gage S and a thermometer $t$, as shown, and a valve V', by which a gas-pressure may be blown off from the receiver when the steam-pressure gage indicates a pressure greater than that indicated by the thermometer.

I do not in this application claim the process carried on by the said apparatus, since the said process is claimed in the original application, Serial No. 211,713, filed June 8, 1904, of which this application is filed as a division, pursuant to a requirement of the Patent Office.

I claim—

The combination with a digester or steam-tight vessel adapted to melt and float the grease from garbage or offal, and provided with a blow-off pipe near its top, of a water and grease receiver above said digester or steam-tight vessel, and separated therefrom by a throat or passage-way containing a valve and a draw-off pipe for water or oil, the said receiver and the said throat being provided with water-glasses, substantially as described.

CHARLES S. WHEELWRIGHT.

Witnesses:
  WILLIAM W. SWAN,
  LYNDE SULLIVAN.